United States Patent [19]
Vernooy

[11] 3,754,463
[45] Aug. 28, 1973

[54] MACHINE FOR MAKING COFFEE AND THE LIKE

[75] Inventor: Thomas Maria Vernooy, De Meern, Netherlands

[73] Assignee: Koninklijke Fabriek Inventum; Fabriek voor Machines en Elektrische Apparaten N.V., both of Leijenseweg, Bilthoven, Netherlands

[22] Filed: Dec. 29, 1971

[21] Appl. No.: 213,611

[30] Foreign Application Priority Data
Dec. 28, 1970 Netherlands.................... 7018834

[52] U.S. Cl.................................. 99/295, 99/302
[51] Int. Cl............................................ A47j 31/00
[58] Field of Search.................. 99/295, 289, 297, 99/302

[56] References Cited
UNITED STATES PATENTS

| | | |
|---|---|---|
| 2,952,202 | 9/1960 | Renner .................... 99/295 |
| 3,260,190 | 7/1966 | Levinson ................. 99/295 |
| 3,403,617 | 10/1968 | Lampe ..................... 99/295 |
| 3,470,812 | 10/1969 | Levinson ................. 99/295 |

Primary Examiner—Robert W. Jenkins
Attorney—Robert E. Wickersham

[57] ABSTRACT

A machine for making a beverage such as coffee. A can piercing member is adapted to move up and down relative to a housing having a reservoir in which water can be heated and then passed through the can. The reservoir communicates with a cylinder having a piston, so that the expansion of the water in the reservoir due to heating causes relative displacement of the piston and the cylinder, and this displacement causes the piercing member to perforate the container for the coffee or similar material.

25 Claims, 3 Drawing Figures

MACHINE FOR MAKING COFFEE AND THE LIKE

BACKGROUND OF THE INVENTION

The invention relates to a machine for making beverages such as coffee.

Machines are known having a piercing member for piercing the wall of a container for solid coffee or the like; the piercing member is arranged in a housing and is adapted to move up and down in the housing. The housing also provides a reservoir in which water is heated and the beverage is made by conducting the water through the pierced container.

In the prior-art machines of this type, which are particularly intended for use in airplanes and the like, it has been necessary, first, to switch on the heater for heating the water in the reservoir. Second, when the water has attained a required temperature, the piercing member was moved, as with the aid of a lever, to pierce the container. Third, the hot water flowed through the container. After a sufficient quantity of water passed through the container, the piercing member had to be moved back, as with the aid of the lever, in order to enable removal of the container. Consequently, during the process of making coffee such machines have had to be constantly supervised and, at given instants, an operator has had to perform various manipulations.

The present invention has the object of providing a machine which is simpler to handle and requires less time from the personnel.

SUMMARY OF THE INVENTION

The reservoir or tank in the housing is connected with a cylinder having a piston, so that the expansion of the water in the reservoir due to heating moves the piston in the cylinder, and this movement of the piston is transferred to the piercing member for piercing the container. A compact construction may be obtained by connecting the piston directly with the piercing member.

Furthermore the invention makes it possible to construct a machine capable of operating automatically, at least for the major part.

Thus means may be provided for cutting off the communication between the reservoir and the cylinder after a given quantity of water has passed through and for then establishing an open communication between the cylinder and a water outlet. Thus, after a sufficient quantity of water has passed through the container, the piercing member can easily be moved automatically back into its initial position.

Other objects and advantages of the invention will appear from a description of a preferred embodiment of the invention.

DESCRIPTION OF A PREFERRED EMBODIMENT

Figure 1:
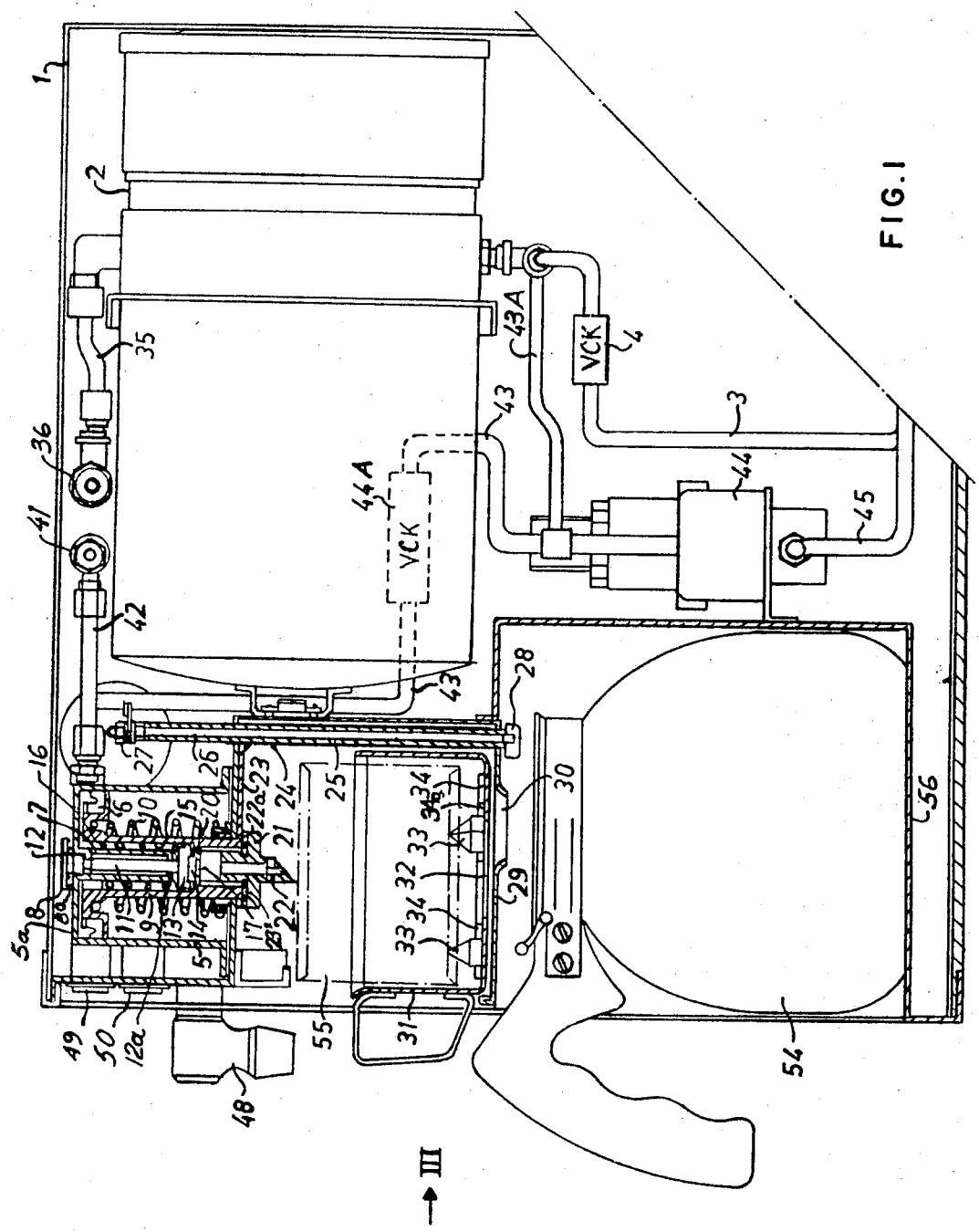
FIG. 1 is a view in elevation, partly in section of a machine embodying the principles of the invention.

The device shown in the drawings comprises a housing 1 accommodating a water reservoir 2. The reservoir 2 has electrically operating heating elements (not shown, being well known). Through a supply pipe 3 having a check valve 4 the reservoir 2 can be connected with a suitable supply of water.

In front of the hot-water reservoir 2, near the upper end of the housing 1, is a cylinder 5, and in the cylinder 5 is a piston 6. A bushing 7, which may be a tubular depression integral with the top wall 5a of the cylinder 5, extends downwardly in the cylinder 5 from the top wall 5a and is preferably coaxial with the cylinder 5. The upper end of the bushing 7 is closed watertight by a plug 8 and gasket 8a. The piston 6 is preferably integral with a tube 9, which coaxially surrounds the bushing 7 and extends downwardly, its lower end projecting below the cylinder 5. The tube 9 is surrounded by a compression spring 10, which tends to hold the piston 6 in about the position shown in FIG. 1.

The bushing 7 accommodates a rod 11 that is provided at its top with an enlarged head 12, and the lower end of the rod 11 projects beyond an inturned rim 12a at the bottom of the bushing 7 into the tube 9 and is there provided with a dished valve closure member 13 having on its lower surface a seat 14 of packing or gasket material. The bushing 7 is surrounded by a compression spring 15 in the tube 9; at one end the spring 15 engages the upper surface of the dished valve 13, and at its other end it engages a few ears 16 on the tube 9 arranged, preferably, at the level of the piston 6 in between the tube 9 and bushing 7. The spring 15 tends to hold the dished valve 13 in the position shown in FIG. 1, where the seat 14 closes an opening 17 in a shoulder 20 in the tube 9. When the seat 14 is retracted from the opening 17, water can pass from the space in the tube 9 above the shoulder 20 to the space below it, and the lower space is internally threaded for receiving in threaded engagement a piercing member 21. The piercing member 21 has a tubular passageway with orifices 22 establishing a communication between the interior of the tube 9 and the exterior of the piercing member 21. The piercing member 21 also has an annular shoulder 22a. With the aid of the piercing member 21, an arm 23 is secured to the tube 9 with a gasket 23a between the members 21 and 23.

The outboard end of the arm 23 is provided with a metal sleeve 24 that holds a tube 25 of insulating material. The tube 25 accommodates a metal pin 26, the top end of which is provided with an electrical contact or binding post 27. The lower end of the pin 26 is provided with a metal cap 28, which is spaced apart, by about 1 cm., from the lower end of the metal sleeve 24. As will be seen, this assembly acts as a level control.

At a given distance beneath the cylinder 5 is a platform 29 with an opening 30 therethrough. In the manner shown in FIG. 1, the platform 30 can receive a receptacle 31, the bottom of which has an opening 32 therethrough. A plurality of piercing members 33 are secured to the upper surface of the bottom wall of the receptacle 31 and are provided with peripheral grooves (not shown). Between the piercing members 33 are raised cams 34 for preventing flat-bottomed containers from flush engagement on the bottom wall 34a of the receptacle 31, which would prevent proper flow of liquid.

Figure 2:
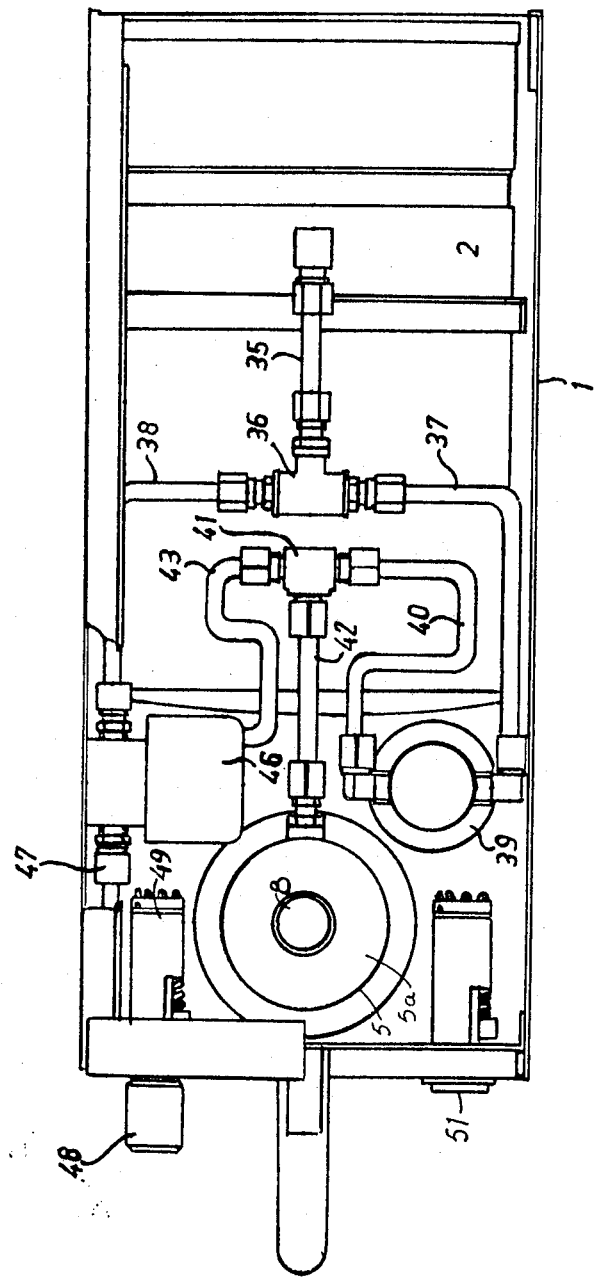
FIG. 2 is a plan view of the machine shown in FIG. 1, the top wall of the housing being omitted.

An outlet pipe 35 leads from the reservoir 2 to a T-shaped connector 36 where it communicates with pipes 37 and 38 (FIG. 2). The pipe 37 leads to an electromagnetically operated valve 39, via which the pipe 37 can be caused to communicate with a pipe 40. The pipe 40 communicates through a T-shaped connector 41 with a pipe 42 and a pipe 43. As shown in FIG. 1, the pipe 42 leads into the cylinder 5 above the piston 6. The pipe 43 leads via a check valve 44A to an electromagnetically operated valve 44 having an outlet pipe 45. The check valve 44A is arranged so that it permits water to pass through the pipe 43 solely in the direction moving toward the valve 44. Between the valves 44A and 44, the pipe 43 is coupled via a pipe 43A with the reservoir 2 at a point spaced from the juncture of the pipe 3 with the reservoir 2. The pipe 38 leads to an electromagnetically operated valve 46 (FIG. 2) and thence to a pipe 47, which is connected with an outlet spigot 48.

Figure 3:
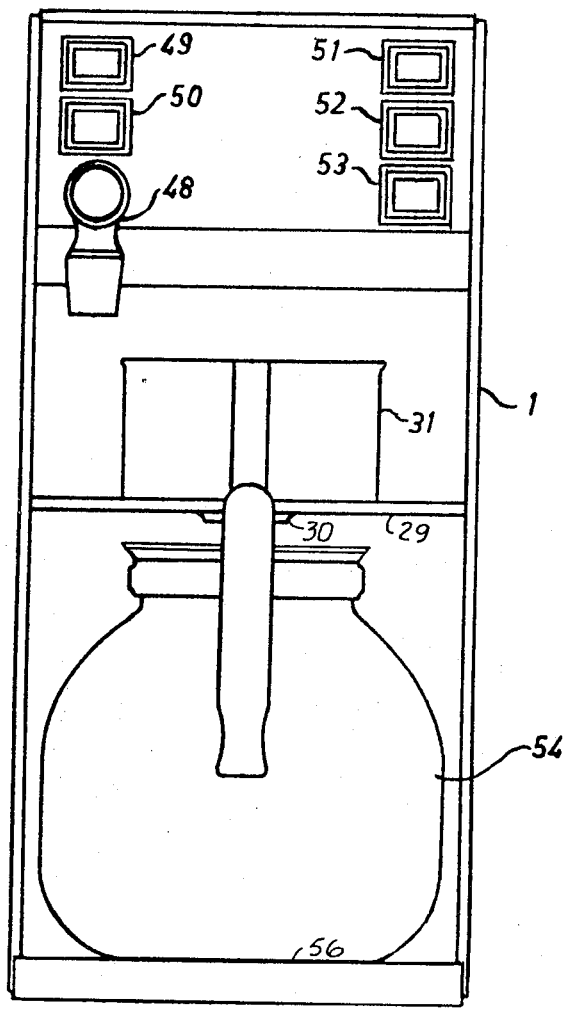
FIG. 3 is an elevation of the machine of FIG. 1 taken in the direction of the arrow III in FIG. 1.

FIG. 3 shows at the front of the device four switches 49, 50, 51 and 52. The switch 49 serves to pass current to the electrical system; the switch 50 serves to actuate the valve 46; the switch 51 serves to switch on the heating elements in the reservoir 2; and the switch 52 serves to actuate a heating plate (not shown) for maintaining the temperature of a coffee pot 54, which can be positioned in the machine on a support 56 below the opening 30 (see FIG. 1), so that the opening 30 and the cap 28 are located above the opening of the pot 54. A signalling lamp 53 provided at the front of the machine is lighted only if there is excessive heating.

Normally the device is connected by the pipe 3 with a suitable supply of running water, and the device is also connected to electric power. When the device has been connected with the water supply and the electrical system has been activated with the aid of the master switch 49, the button 50 is pressed, so that the electromagnet of the valve 46 is energized and the valve 46 is opened. Then the outlet pipe 35 of the reservoir 2 communicates through the T-shaped connector 36 and the pipes 38 and 47 freely with the outlet spigot 48, so that water can flow into the system; when water begins to flow out of the spigot 48, the system is completely filled. Then the button 50 is pressed again to deenergize the electromagnet of the valve 46 and to close the valve 46.

During the normal use of the device, cold or hot water can be taken from the reservoir 2 via the outlet spigot 48 by pressing the button 50. For example, hot water for making tea can be obtained. When heating up water for making tea and the like, the valve 39 is kept closed when the heating elements in the reservoir 2 are switched on.

For making coffee or the like a closed container 55 (which may be a tin or can containing ground coffee or the like) is positioned to rest on top of the piercing members 33 in the receptacle 31 and is arranged in the machine in the manner shown in FIG. 1, the piercing member 21 being located directly above the container 55. Subsequently, the heating elements in the reservoir 2 are switched on by pressing the button 51. When the water in the reservoir 2 is heated, it expands and flows to the cylinder 5 via the pipe 37, the valve 39 (which is opened upon actuation of the button 51 by the resulting energization of its electromagnet), the pipe 40, and the pipe 42. Since the valve 44 at this time is closed, the pipe 43, the reservoir 2, and the other pipes form a closed circuit so that the pressurized hot water can escape only toward the cylinder 5. A pressure safety member is provided ahead of the valve 44.

The water coming into the cylinder 5 pushes against the piston 6, which has the piercing member 21 secured thereto and urges the piston 6 downwardly so that the projecting tip of the piercing member 21 is forced through the top wall of the container 55. Upon a further increase in temperature and a further expansion of the water, the piston 6 is urged further downwards and the shoulder 22a surrounding the projecting end of the piercing member 21 engages the top wall of the container 55 and urges the container 55 downwardly so that its bottom wall is perforated by the piercing members 33. During this time the ears 16 are also moving down, and so the spring 15 keeps the seat 14 closed. Just before the piston 6 reaches its extreme downward position, the head 12 comes into contact with the stop formed by the internal rim 12a at the bottom of the bushing 7. As a result, the shoulder 20 moves away from away valve member 13 and its seat 14, and hot water can flow via the opening 17 and the orifices 22 of the piercing member 21 into the container 55. A temporary decrease in pressure will occur, but the pressure is soon restored. The hot water then passes through the container 55 and passes along the grooves of the piercing members 33 through the openings 32 and 30 and into the pot 54.

During the downward movement of the piston 6, the level control assembly formed by the pin 26 with the tube 25, the cap 28, and the sleeve 24 is also moved downwardly, so that the lower end of this level control assembly enters the pot 54 and acts as a blocking member, preventing removal of the pot 54 out of the machine before the level control assembly and the piston 6 have been moved upwardly into the position shown in FIG. 1.

When the piston 6 is moved into its lowermost position, the cap 28 at the lower end of the level control assembly is located at a given distance beneath the upper end of the pot 54, this distance being determined in aircraft by the normal maximum angle of deviation between the longitudinal axis of the aircraft and the horizontal, where the liquid contained in the pot 54 is still prevented from flowing out of the pot 54.

As water is supplied via the container 55 into the pot 54, the level of the liquid in the pot 54 rises when it comes into contact with the cap 28, the electrical contact 27 is connected to ground, thereby switching off the heating elements in the reservoir 2 and de-energizing the electromagnet of the valve 39, so that the valve 39 is closed, and the supply of water via the container 55 to the pot 54 is cut off. Simultaneously, the electromagnet for the valve 44 is switched on, and this valve 44 is kept open for about one minute with the aid of a time relay. Thus through the pipe 42, the T-shaped connector 41, the pipe 43, and the open valve 44, the cylinder 5 is into open communication with the outlet pipe 45, so taht the pressure drops down to atmospheric. At the same time the reservoir 2 is flushed by incoming cold water from the mains, flowing away via the pipe 43A. The check valve 44A prevents the cold water from penetrating further into the pipe 43. The period of about one minute is sufficient for fulfilling the initial conditions of temperature and pressure. The whole system is then refilled with cold water, and the process can start again when the button 51 is pressed again, since at the loss of its actuating pressure, the piston 6 having been returned by the spring 10 to the position shown in FIG. 1, and the water contained in the cylinder 5 having been conducted away via the pipe 45. Also, the level control assembly is carried upwardly with the piston 6, so that the pot 54 can be removed from the machine.

It may occur that due to transitional resistances and the like a satisfactory ground connection of the contact 27 is not obtained when the liquid in the pot 54 comes into contact with the cap 28. If that happens, the liquid may rise in the pot 54 a further 1 cm. and then a short-circuit connection is established through the liquid between the cap 28 and the metal tube 24, so that a satisfactory ground connection is ensured and the valve 39 is closed as described above and the valve 44 is opened. After an empty pot 54 is inserted and a new container 55 is arranged in place, the cycle described above can be repeated.

The coffee in the pot 54 can be kept hot by means of a heating element (not shown), below the platform 56, which can be switched on by means of the button 52.

It will be apparent that for operating the machines described in the foregoing it is only necessary to arrange the pot 54 and the container 55 in the machine and to press the button 51, and then the whole process of making coffee or the like is performed automatically, and after an interval the filled coffee pot 54 and the used container 55 can be taken out of the machine, without need for further manipulations. The level control formed by the parts 24 to 28 is employed, in addition, as a blocking member for the pot 54 in order to prevent removal of the pot 54 from the machine before the supply of water to the piercing member 21 is cut off.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A machine for making a beverage, such as coffee, from a closed container of solid beverage base, by piercing the container and flowing hot water therethrough, including in combination
    a main housing having a reservoir, means for heating water in the reservoir, a receptacle for a said container, and a support for a collecting vessel below said receptacle,
    means for piercing a said container installed in said receptacle to enable flow of water from said reservoir through said container into said collecting vessel, said piercing means being movable up and down in said housing,
    a cylinder in communication with said reservoir and having a piston that is moved in said cylinder upon the expansion of the water in the reservoir due to heat, and
    connecting means for connecting said piston and said piercing means for causing movement of said piercing means when said piston is moved.

2. A machine as claimed in claim 1 wherein the piston is directly connected to said piercing means.

3. A machine as claimed in claim 1 wherein said connecting means comprises a hollow tube fastened to said piston, said piercing means being secured to the lower end of said tube.

4. A machine as claimed in claim 3 wherein said hollow tube includes a valve for closing the passage from the interior of the hollow tube to said piercing means, and stop means for opening and holding open said valve at the position near the end of the stroke of the piston where the container is perforated.

5. A machine as claimed in claim 4 wherein said valve comprises a valve seat and a stem having its upper end provided with a cap, and a bushing coaxially arranged in said tube, said stem passing through the lower edge of said bushing, said bushing forming said stop means and cooperating with said cap.

6. A machine as claimed in claim 4 wherein there is a spring in said tube opposing the opening of said valve member.

7. A machine as claimed in claim 1, wherein there is a spring in said cylinder opposing the movement of said piston as urged by the expanding water.

8. A machine as claimed in claim 1 having water outlet means and means for cutting off the communication between the reservoir and the cylinder, after a given quantity of water has passed through, and for establishing an open communication between the cylinder and said water outlet means.

9. A machine as claimed in claim 8 characterized in that the cylinder communicates with an outlet pipe, having an electromagnetically operable valve.

10. A machine as claimed in claim 9 characterized by control means actuated after a given quantity of water has passed through said outlet pipe for keeping the valve in the outlet pipe open for about one minute.

11. A machine as claimed in claim 9 having a by-pass and check valve between the cylinder and the electromagnetically operable valve in the outlet pipe, said by-pass and check valve allowing water to pass through only in a direction flowing away from the cylinder.

12. A machine as claimed in claim 11 characterized in that a further pipe is connected with the outlet pipe between the by-pass valve and the electromagnetically operated valve, said further pipe being in open communication with the reservoir.

13. A machine as claimed in claim 8 having an insulated metal pin connected with the piston, said pin being connected at its upper top end with an electrical terminal so that, at the displacement of the piston during the process of making the beverage, the pin is inserted into a coffee pot, or the like so that as soon as the liquid level in the pot reaches the lower end of the pin, the pin and the electrical terminal are connected to ground via the liquid, and electrically operated mechanism actuated by said grounding for cutting off the water supply.

14. A machine as claimed in claim 13 characterized in that said pin is arranged in an insulated manner in a metal tube, the lower end of which is located at a distance of about 1 cm. from the lower end of the pin.

15. A machine as claimed in claim 1 having an electromagnetically operable valve arranged in a water supply duct between the reservoir and the cylinder.

16. A machine as claimed in claim 1 wherein the reservoir communicates through a pipe with an outlet spigot, the pipe including an electromagnetically operable valve.

17. A device for making a hot beverage by piercing both the top and bottom walls of a closed container of solid beverage base and flowing hot water therethrough, including in combination
    a reservoir,
    means for heating water in said reservoir,
    a cylinder in communication with said reservoir, a receptacle for a said container below said cylinder, a support for a collecting vessel below said receptacle, first piercing means located at the bottom of said receptacle, second piercing means movable vertically for first piercing the top wall of a said container installed in said receptacle and then engaging said container and forcing it down on said first piercing means to cause the piercing of the bottom wall of said container, means for sending water from said reservoir through said cylinder to said container when said container is pierced, and a piston in said cylinder that is moved upon the expansion of the water in the reservoir due to heat, said piston being connected to said second piercing means, so that said second piercing means is moved to cause the piercing of said container when said piston is moved.

18. The device of claim 17 having a hollow tube fastened to said piston, said piercing means being secured to the lower end of said tube, said piercing means having a passageway therethrough, hot water passing through said tube and passageway after piercing of said container.

19. The device of claim 18 having a valve in said hollow tube normally closing the passage from the interior of the hollow tube to the passageway of said piercing means, and means for opening and holding open said valve at the position shortly before the end of the stroke of the piston.

20. The device of claim 19 wherein said valve comprises a valve seat the lower end of a stem having its upper end provided with an enlarged diameter cap, a stationary bushing coaxially arranged in said tube and having an internal rim at its lower edge, said stem extending below and above said rim and said valve being opened by engagement of said cap with said pin.

21. The device of claim 17 having water outlet means from said reservoir, metering means for cutting off the communication between the reservoir and the cylinder, after a given quantity of water has passed through, and drain means for establishing an open communication between the cylinder and said water outlet means.

22. The device of claim 21 having flashing means and a control valve actuated after a given quantity of water has passed through said outlet means for keeping said drain means open for about one minute thereafter.

23. The device of claim 21 having an insulated metal pin connected with said piston, said pin being connected at its upper top end with an electrical terminal, said pin, at the displacement of the piston during the process of making the beverage, being inserted into said collecting vessel and when the liquid level in the vessel reaches the lower end of the pin, the pin and the electrical terminal are connected to ground via the liquid, and electrically operated means actuated by said grounding for cutting off the water supply to said cylinder.

24. The device of claim 23 wherein said pin is enclosed in and insulated from a metal tube, to which said terminal is also connected, the lower end of said tube being located at a distance of about 1 cm. from the lower end of the pin, for short-circuit action in case the grounding action is unsuccessful.

25. A device for making a hot beverage by piercing both the top and bottom walls of a closed container of solid beverage base and flowing hot water therethrough, including in combination:

a reservoir connected to running water, means for heating water in said reservoir, a vertical cylinder having its upper end connected to said reservoir, a receptacle for a said container directly below said cylinder, a support for a collecting vessel directly below said receptacle, first piercing means located at the bottom of said receptacle, a piston movable vertically and having a central axial tubular portion for passage of liquid from said cylinder, valve means normally closing the lower end of said tubular portion, in said cylinder, spring means normally urging said piston to the upper end of said cylinder, the expansion of the water in the reservoir due to heat urging said piston downwardly in said cylinder, second piercing means secured to the lower end of said tubular portion of said cylinder and movable vertically therewith for piercing the top wall of a said container installed in said receptacle and having a shoulder for engaging said container and forcing it down on said first piercing means to cause the piercing of the bottom wall of said container, said second piercing means having a passageway connected to said tubular portion, and means for opening said valve means when said piston approaches the end of its downward stroke.

* * * * *